United States Patent [19]
Nambu

[11] Patent Number: 4,747,115
[45] Date of Patent: May 24, 1988

[54] BUS-REDUNDANCY TYPE APPARATUS FOR A TRANSMITTING SYSTEM

[75] Inventor: Shigeo Nambu, Fuchu, Japan

[73] Assignee: Kabushiki Kaisha Toshiba, kawasaki, Japan

[21] Appl. No.: 889,627

[22] Filed: Jul. 28, 1986

[30] Foreign Application Priority Data

Jul. 26, 1985 [JP] Japan .................................. 60-165534
Mar. 31, 1986 [JP] Japan .................................. 61-71173

[51] Int. Cl.⁴ .......................... H04L 1/20; H04L 1/22
[52] U.S. Cl. ...................................... 375/100; 375/40; 340/825.01; 455/134
[58] Field of Search .................... 375/38, 40, 100, 102; 340/825.01, 825.03, 825.04; 455/8, 50, 52, 133, 134

[56] References Cited

U.S. PATENT DOCUMENTS 2,543,256  2/1951  Peterson .............................. 455/133
4,385,392  5/1983  Angell et al. ................. 340/825.01

Primary Examiner—Robert L. Griffin
Assistant Examiner—Marianne Huseman
Attorney, Agent, or Firm—Oblon, Fisher, Spivak, McClelland & Maier

[57] ABSTRACT

A bus-redundancy type apparatus for a transmission line is disclosed, which comprises first and second transmission lines respectively provided as a normally operating transmission line and a stand-by transmission line for data transmission in a transmitting system, in which bus-access control is performed, first and second carrier detectors for receiving transmission data from said respective first and second transmission lines and for detecting carrier components in the transmission data, a carrier-disappearance detector for receiving the results of detection by the first and second carrier detectors and for providing a carrier-disappearance signal when it is detected that neither of the first and second carrier detectors detects any carrier component, a transmission line-switching command generator for providing a transmission line-switching command, to select either one of the first and second transmission lines, a switching unit for selecting transmission data from the first and second transmission lines, to be received, and a controller for receiving a carrier-disappearance signal from the carrier-disappearance detector and a transmission line-switching command from the transmission line switching command generator, and for supplying the transmission line-switching command to the switching unit at the time of reception of the carrier-disappearance signal.

5 Claims, 4 Drawing Sheets

BUS-REDUNDANCY TYPE APPARATUS FOR A TRANSMITTING SYSTEM

BACKGROUND OF THE INVENTION

This invention relates to a bus-redundancy type apparatus for a transmitting system and, more particularly, to an apparatus having a twofold transmission line construction, so that one of the transmission lines can serve as a back-up to the other when the other is in trouble or undergoing inspection, or when it is necessary to back up the other transmission line for other reasons.

As examples of a bus-access control system for a multi-drop or bus type transmission line in a local area network with a plurality of stations connected to a transmission line, a token-passing system and a CSMA/CD (carrier sense multiple access/collision detection) system are well known in the art.

The token-passing system is one in which a token, as a permission to transmit, is given to particular stations to permit communication. In this sytem, therefore, the time necessary for moving the token constitutes an overhead, even if the transmission clock rate is increased to improve the transmitting speed. For this reason, there has been a limit on the improvement of the transmitting speed.

The CSMA/CD system, on the other hand, is one in which transmitting is allowed in the case of absence of a signal on the transmission line, that is, in the absence of communication, at which time no carrier is detected by carrier sensing. In this CSMA/CD system, the probability of collision of signals is increased with an increase in traffic. The system, therefore, is not suited for purposes requiring real time, e.g., voice communication and process control services. When there is a carrier, a station requiring to transmit must wait a predetermined period of time before effecting carrier sensing again. For this reason, the CSMA/CD system is not suited for a network, which is subject to congestion of transmitted signals and requires real time for communication.

As a means of providing a bus-access control system which can overcome the above drawbacks, an implicit token-passing system has been contemplated. In this system, are station is assigned for providing a synchronizing signal to the bus. Also, time slots are set for predetermined time intervals (which need not be constant) with respect to the synchronizing signal generated from the predetermined station, and specific time slots are allotted to the individual stations. Each station is allowed to transmit a signal during its allotted time slot. Each station can detect the time slots by carrier sensing, noted above with reference to the synchronizing signal, and it counts the detected time slots so that it can detect their order. When it detects its own allotted time slot, it transmits a signal together with information concerning the destination station.

In such a system, the number of different time slots is made equal to the number of stations present on the bus, and when the maximum count of time slots is reached, the synchronizing signal is generated once again to repeat the operation.

A feature of this system is that because each station has its own predetermined time slot, it can always transmit a signal for each cycle. Thus, it is possible to eliminate the inconvenience of waiting for permission to transmit after a collision of signals, as in the case of the CSMA/CD system. Also, since there is no need to shift the token, the overhead can be eliminated. Further, where communication is permitted among a plurality of stations using the above bus-access control system, such communication is possible during one cycle, as follows:

For the sake of simplicity, it is assumed that time slots $TS_n$ ($n = 1, 2, \ldots$) are allotted to respective stations $ST_n$ ($n = 1, 2, \ldots$). The time slots may be freely allotted to the stations, so long as the same time slot is not allotted to two or more stations. In this system, it is possible to designate stations perticipating in the transmission and reception of signals, e.g., transmitting from station ST1 to station ST3 is designated by time slot TS1, transmitting from station ST2 to station ST1 is designated by time slot TS2, transmitting from station ST2 to station ST1 is designated by time slot TS3, and so forth.

In a data transmitting system such as a local area network, a redundant transmission line is usually provided to ensure reliability, as in the case where the system is to be applied to industrial control systems. The extent of redundancy provision varies, from system to system, e.g., from one in which all the constituent elements of a line are duplicated, to one in which only the transmission line is duplicated. However, due to considerations of economy and the trouble factor, the following system is usual; that is, a twofold transmission line construction consisting of two transmission lines, i.e., normally operating and stand-by transmission lines, and drivers and receivers coupled to the individual lines are also duplicated. When carrying out transmission, the same data is transmitted from a transmission controller to the twofold transmission line, through first and second switches. When engaged in reception, data on either one of the two transmission lines is selected through a third switch to be received in a reception controller. The transmission line interface of each station of the bus-access control system is constructed as aforementioned.

When applying each bus access control system noted above to a transmission system having a twofold transmission line structure, a CPU suitably switches the normally operating and stand-by transmission lines as the reception side transmission line. At this time, the timing of switching of the reception side transmission line is important. In the token-passing system noted above, the station which transmits the token governs the overall transmission. Therefore, a processor which controls the transmission can switch the transmission line according to a predetermined program. The timing of switching of the reception side transmission line can thus be readily determined.

In the case of the implicit token-passing system, on the other hand, each station continuously transmits such packets as frame header, agent packet, dummy packet, and data packet to the transmission line. Therefore, no problem occurs when the switching of the reception side transmission line is effected by a transmission control processor at a timing between packets, i.e., when there is no signal on the line. However, when the switching is performed in the presence of a packet, the received data is interrupted, resulting in an error.

Further, in the case of the CSMA/CD system, each station transmits at a desired timing, switching the reception side transmission line in the presence of a packet, and hence, the resultant generation of an error is liable to occur, as in the case of the implicit token-passing system.

When switching the transmission line in the above transmitting system, it is necessary to check, at the time of switching, whether the normally operating or stand-by transmission line is operative. For example, in a recent optical transmitting system using a star coupler featuring a noise-proof property, optical fiber cables are provided for transmission and reception for each station. To check for a defective part, therefore, it is necessary to transmit a check packet for each station, and confirm the presence of absence of the response.

Therefore, the time necessary for the check is increased with any increase in the number of stations, thus spoiling the high speed response of the bus-access system. Thus, a station for performing the check is limited to only one station.

SUMMARY OF THE INVENTION

It is, therefore, an object of the present invention to provide a new and improved bus-redundancy type apparatus for a transmitting system, which has a twofold transmission line construction, so that one of the transmission lines can serve as a back-up for the other when the other is in trouble or undergoing inspection, or when it is necessary to back up the other transmission line for other reasons.

For example, according to the present invention, in a transmitting system having a twofold transmission line structure applied to a bus-access control system, such as an implicit token-passing system or a CSMA/CD system, the reception side transmission line is switched only during the signal period between adjacent packets. Thus, there is no possibility of interruption of transmission data, to cause generation of an error, and it is possible to ensure steady data transmission.

Another object of the present invention is to provide a switching apparatus for a twofold transmission line, which can automatically check without a check packet from a specific station, which can check at the time of switching whether one of the twofold transmission lines is operative, and which is capable of abnormality detection at the station connected to the transmission line.

According to one aspect of the present invention, there is provided a bus-redundancy type apparatus for a transmitting system, comprising:

first and second transmission lines respectively provided as a normally operating transmission line and a stand-by transmission line for data transmission, in which bus-access control is performed;

first and second carrier-detection means for receiving transmission data from said respective first and second transmission lines and detecting carrier components in said transmission data;

carrier-disappearance detection means for receiving the results of detection by said first and second carrier detection means and providing a carrier-disappearance signal when it is detected that neither of said first and second carrier detection means detects any carrier component;

transmission line-switching command means for providing a transmission line-switching command to select either one of said first and second transmission lines;

switching means for switching transmission data from said first and second transmission lines to be received; and control means for receiving carrier-disappearance signal from said carrier-disappearance detection means and a transmission line-switching command from said transmission line-switching command means, and supplying said transmission line-switching command to said switching means at the time of reception of said carrier-disappearance detection signal.

BRIEF DESCRIPTION OF THE DRAWINGS

These and other objects and features of the present invention can be understood from the description of the following embodiment by reference to the accompanying drawings, in which.

DETAILED DESCRIPTION OF THE PREFERRED EMBODIMENT

Figure 1:
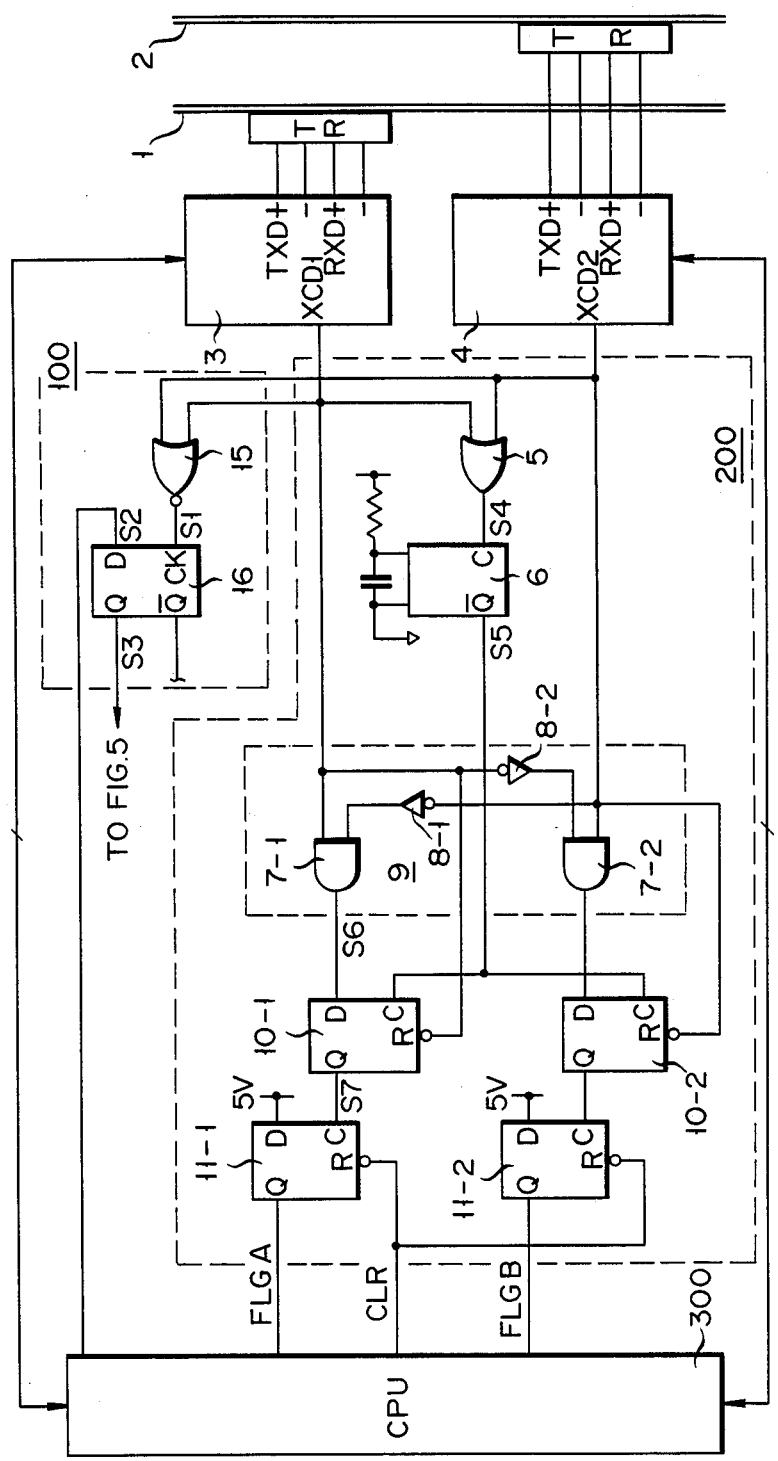
FIG. 1 is a schematic representation of an embodiment of the invention.
Figure 5:
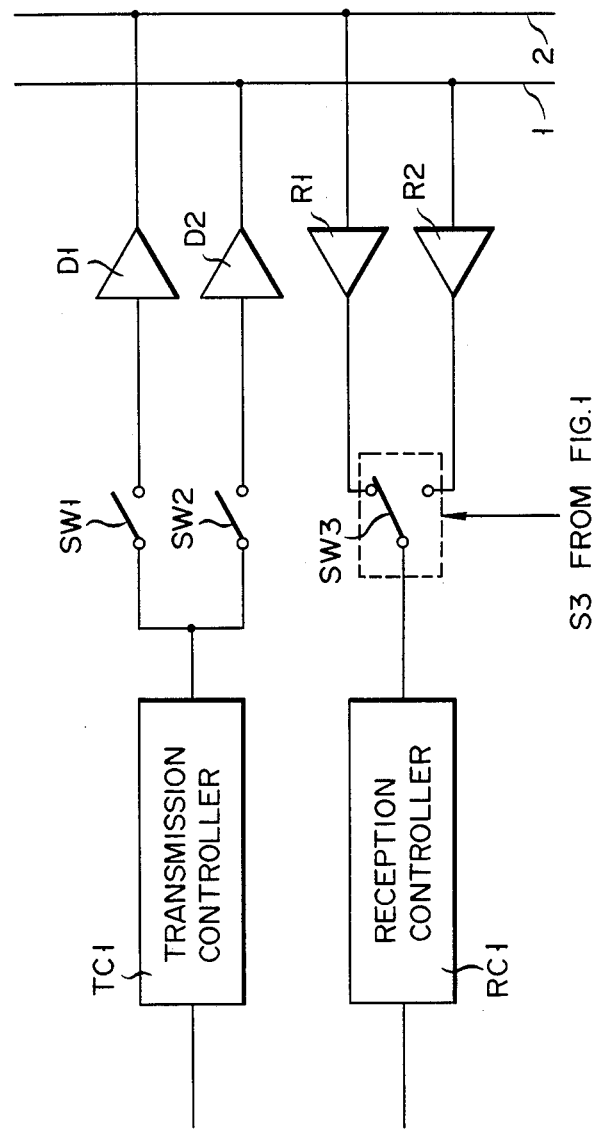
FIG. 5 is a schematic representation showing status of connection transmission and reception controllers in each station of the same embodiment, to the transmission line.

FIG. 1 is a schematic representation of an embodiment of the invention applied to a transmitting system having a twofold transmission line structure, in which the bus-access control is effected by an implicit token-passing system. Referring to the Figure, reference numerals 1 and 2 respectively designate normally operating and stand-by transmission lines individually consisting of coaxial cables. Serial interfaces 3 and 4 are connected to respective transmission lines 1 and 2. These serial interfaces 3 and 4 are each an interface LSI between the transmission controller and the transmission lines, and each include a Manchester encoder, a decoder, a carrier detector, a driver, and a receiver. In this embodiment, a well-known Ethernet Encoder/Decoder MB502A (by Fujitsu) which is well-known as interface LSI, is employed as each serial interface. Briefly, the interface LSI includes drivers D1 and D2, receivers R1 and R2 and part of transmission controller TC1 and reception controller RC1, as shown in FIG. 5. In FIG. 1, switches SW1 and SW2 for transmission and switch SW3 for reception are omitted.

The carrier detectors in interfaces 3 and 4 detect carriers on respective transmission lines 1 and 2. They provide carrier sense outputs XCD1 and XCD2, which go to high level when a carrier is detected, as carrier-disappearance sense signal S1. NOR gate 15 provides NOR of these two outputs as carrier-disappearance sense signal S1. Carrier-disappearance sense signal S1 is fed as a clock signal to a CK terminal of D-type flip-flop (hereinafter referred to as DFF) 16 which constitutes switching unit 100 together with NOR gate 15. DFF 16 stores transmission line-switching command signal S2 from central processor unit (CPU) 300 when carrier-disappearance sense signal S1 is at a low level. DFF 16 provides transmission line-switching command signal S2 as transmission line-switching signal S3 to reception side switch SW3 shown in FIG. 5, when there is no carrier on either of the normally operating and stand-by transmission lines 1 and 2, respectively, i.e., when carrier-disappearance sense signal S1 rises. According to transmission line-switching signal S3, either one of the two transmission lines is selected as the reception side transmission line through reception side switch SW3, as shown in FIG. 5. Reception controller 2 performs reception of transmission data which is present on the selected transmission line. Transmission line switching-command signal S2 commands the selection of normally operating transmission line 1 when it is at low level, while it commands selection of stand-by transmission line 2 when it is at high level.

Figure 2:
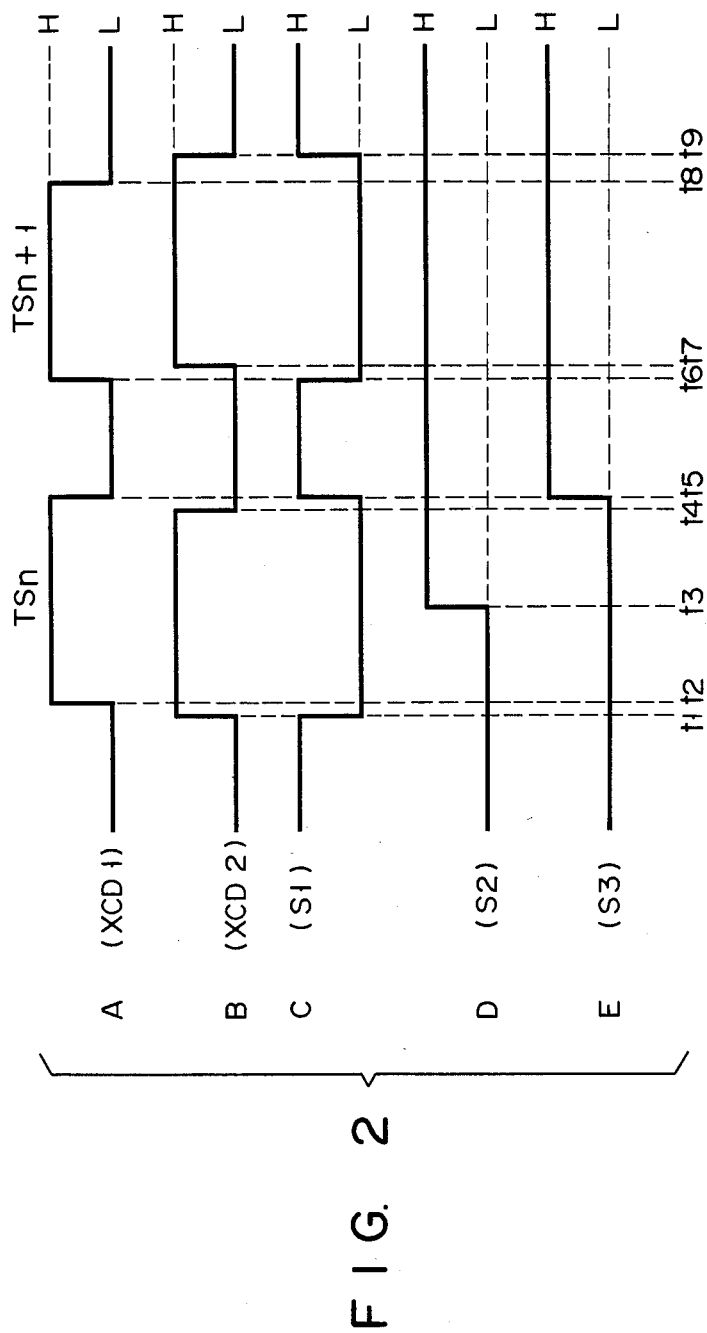
FIG. 2 is a time chart for explaining the operation of a switching unit in the same embodiment.

The operation of switching unit 100 having the above construction will now be described with reference to the time chart shown in FIG. 2. It is assumed that time slot TSn is provided to normally operating and stand-by transmission lines 1 and 2. It is also assumed that the carrier is present on normally operating transmission line 1 from instant t2 till instant t5 (i.e., for the high level period of signal XCD1 as shown in A in FIG. 2), while it is present on stand-by transmission line 2 from instant t1 till instant t5 (i.e., for the high level period of signal XCD2 as shown in B in FIG. 2). It is further assumed that at instant t1 transmission line-switching signal S3 is at low level as shown in E in FIG. 2, so that normally operating transmission line 1 is selected as the reception side transmission line. Then, the output of NOR gate 15, i.e., carrier-disappearance sense signal S1, falls at instant t1 and is held at low level until instant t5. DFF 16 stores transmission line-switching command signal (shown in D in FIG. 2) from CPU 300 from instant t1 till instant t5. When carrier-disappearance sense signal S1 rises at instant t5, transmission line-switching command signal S2 is provided as transmission line-switching signal S3 (as shown in E in FIG. 2), and according to this signal S3 the reception side transmission line is selected through reception side switch SW3 shown in FIG. 5. At this time, transmission line-switching command signal S2 is switched from low level (for selection of normally operating transmission line 1) over to high level (for selection of stand-by transmission line 2) at instant t3 (which is later than instant t1 and earlier than instant t5). In accordance with this level change, transmission line-switching signal S3 is switched from low level over to high level at instant t5 (as shown in E in FIG. 2). As a result, stand-by transmission line 2 is selected as the reception side transmission line, and subsequent to instant t5, the transmitted data from stand-by transmission line 2 is received.

The same operation takes place in the case where time slot TSn+1 is provided to both transmission lines 1 and 2. More specifically, carrier-disappearance sense signal S1 is at low level (as shown in C in FIG. 2) while the carrier is present on at least one of transmission lines 1 and 2, i.e., during a period from instant t6 till instant t9. During this period, DFF 16 stores transmission line-switching command signal S2, as shown in D in FIG. 2. When carrier-disappearance sense signal S1 rises at instant t9, as shown in C in FIG. 2, transmission-switching command signal S2, having been stored (D in FIG. 2) is provided as transmission line-switching signal S3 (E in FIG. 2). In this case, transmission line-switching command signal S2 (D in FIG. 2) remains at high level, so that no switching of the reception side transmission line is effected.

In the foregoing, carrier sense outputs XCD1 and XCD2 of normally operating and stand-by transmission lines 1 and 2, rise at different timings in time slots TSn and TSn+1. This is based on the assumption of a propagation delay time in the case where the transmission distance between two stations allotted for time slots TSn and TSn+1 varies depending upon whether normally operating transmission line 1 or stand-by transmission line 2 is used.

As has been shown, switching unit 100 is capable of switching the reception side transmission line according to transmission line-switching command signal S2 from CPU 300 when carrier-disappearance sense signal S1 from NOR gate 15 is at high level, i.e., when no carrier is present in either of the normally operating and stand-by transmission lines. Thus, transmission lines are never switched while a frame header, agent packet, dummy packet, data packet, etc. is being received, and are switched under the control of a command from CPU 300 only during the signal-free period between adjacent packets. Thus, there is no possibility of interruption of transmission data, to cause generation of an error, and it is possible to ensure steady data transmission, i.e., reliable back-up.

Now, referring back to FIG. 1, abnormality detection unit 200, which is operated at the time of the switching of transmission lines, described above, and also in other necessary cases, will be described. OR gate 5 provides an OR output of carrier sense outputs XCD1 and XCD2 of interfaces 3 and 4. The OR output is fed as a trigger signal to one-shot timer circuit 6. One-shot timer circuit 6 and OR gate 5 provide a timing signal for detecting the presence or absence of a carrier, through correction of a time difference, caused by the difference in the carrier transmission line length between normally operating transmission line 1 and stand-by transmission line 2.

AND gates 7-1 and 7-2 inverters 8-1 and 8-2 constitute carrier check circuit 9, in which AND gates 7-1 and 7-2 each provide an output of logic level "1" when neither of carrier sense outputs XCD1 and XCD2 of the normally operating and stand-by transmission lines is present.

D-type flip-flops (DFF) 10-1 and 10-2 store the output of carrier check circuit 9 according to the timing signal from one-shot timer circuit 6. When a carrier is present on either of the normally operating and stand-by transmission line, they they provide "1" level outputs which are fed to flip-flops (FF) 11-1 and 11-2 which serve as latch registers. When an error occurs between signals on normally operating and standby transmission lines 1 and 2 during one frame from the instant of the appearance of a synchronizing signal till the instant of appearance of the next synchronizing signal, one of FFs 11-1 and 11-2, which is monitoring the transmission line on which no carrier is present, provides an abnormality detection flag FLG A or FLG B to CPU 300.

When CPU 300 detects the abnormality detection signal as CPU lead status, it processes the signal, and then it feeds a clear command to FFs 11-1 and 11-2 to clear the same.

Figure 3:
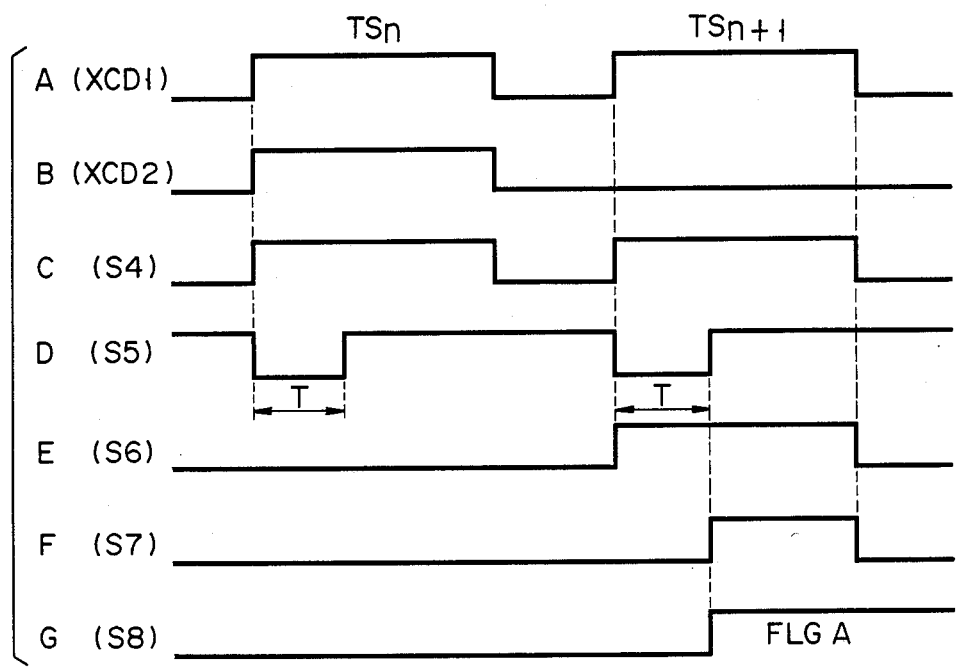
FIG. 3 is a time chart for explaining an abnormality detection unit of the same embodiment.

FIG. 3 is a time chart for explaining the operation of abnormality detection circuit 200. When a carrier is present on both normally operating and stand-by transmission lines 1 and 2 in time slot TSn, OR gate 5 provides output S4 of "1" level (as shown in C in FIG. 3) to one-shot timer 6, in response to the earlier rise of carrier sense outputs XCD1 and XCD2 from interfaces 3 and 4. Output S5 (D in FIG. 3) of one-shot timer 6 rises after a predetermined period T of time, and AND gate 7-1 judges the coincidence of carrier sense outputs XCD1 and XCD2 on transmission lines 1 and 2. When carrier sense outputs XCD1 and XCD2 are coincident, DFF 10-1 and FF 11-1 are both held at "0" level, and neither of abnormality detection flags FLG A and FLG B is provided to CPU 300.

When no carrier is present on stand-by transmission line 2 in time slot TSn+1, OR gate 5 provides output S4 in response to the rise of carrier sense output XCD1 of normally operating transmission line 1. As a result, output S5 of one-shot timer 6 is inverted and falls. Subsequently, it rises as a timing signal after the lapse of a predetermined period T of time. Since carrier sense output XCD1 is present only on normally operating transmission line 1, AND gate 7-1 provides output S6 of "1" level (as shown in E in FIG. 3) in response to the rise of carrier sense output XCD1 of normally operating transmission line 1. When timing signal S5 rises, output S7 of DFF 10-1 is inverted to "1" level, and FF 11-1 provides abnormality detection signal flag FLG A (as shown in G in FIG. 3). Subsequently, output S7 of DFF 10-1 falls in response to the fall of carrier sense output XCD1 of normally operating transmission line 1.

When no carrier is present on normally operating transmission line 1, abnormality detection flag FLG B is provided through AND gate 7-2 and FFs 10-2 and 11-2, in the same manner as described above.

As has been shown, when no carrier is present on either the normally operating or the stand-by transmission line during one frame, abnormality of that transmission line or a transmitting part of each station can be detected, so that it is possible to reliably command back-up by the other transmission line.

Further, with this construction it is possible to detect the disappearance of a carrier on either the normally operating or the stand-by transmission line 1 or 2 in a certain time slot. Further, the sampling instant is delayed by a predetermined period of time by a one-shot timer 6, to compensate for the difference in the transmission line length, i.e., the difference in the transmission distance, between the normally operating and stand-by transmission lines. This is done because the normally operating and the stand-by transmission lines are usually laid along different routes to prevent accidents, so that it is necessary to prevent an erroneous judgement of abnormality of the transmission line having the longer distance, due to a propagation delay.

Further, it is possible to provide a method for informing the CPU of the disappearance of a carrier by means of a status signal, and to provide means for memorizing the location number of the slot in which the abnormality has occurred.

Figure 4:
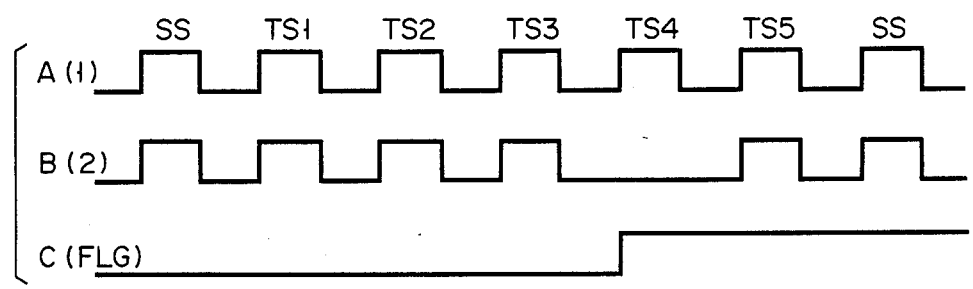
FIG. 4 is a time chart for explaining signals on the normally operating and stand-by transmission lines, and the abnormality detection flag.

FIG. 4 is a view for explaining the status of signals on normally operating and stand-by transmission lines 1 and 2, detected by abnormality detection circuit 200 according to the invention. Symbols SS represent synchronizing signals, and TS1 and TS5 are time slots. The Figure illustrates that abnormality detection flag FLG (C in FIG. 4) rises when there is no carrier on stand-by transmission line 2 in time slot TS4.

The above embodiment of the invention is by no means limitative. For example, while the above embodiment is concerned with a transmitting system, in which the bus-access control is performed by an implicit token-passing system, the invention may of course be applied as well to a CSMA/CD transmitting system, in which the bus access control is performed independently of the processor program, as in the implicit token-passing system. Further, while the above embodiment is concerned with a twofold transmission line structure with each line consisting of a coaxial cable, it is also possible to realize transmission of signals using optical fiber cables. In this case, different stay couplers are used for the normally operating and stand-by transmission lines. Further, various other changes and modifications of the embodiment are possible without departing from the scope of the invention.

What is claimed is:

1. A bus-redundancy type apparatus for a transmitting system, comprising:
    first and second transmission lines respectively provided as a normally operating transmission line and a stand-by transmission line for data transmission in a transmission system, in which bus access control is performed;
    first and second carrier-detection means for receiving transmission data from said respective first and second transmission lines and for detecting carrier components in said transmission data;
    carrier-disappearance detection means for receiving the results of detection by said first and second carrier-detection means and for providing a carrier-disappearance signal when it is detected that neither of said first and second carrier detection means detects any carrier component;
    transmission line-switching command means for providing a transmission line-switching command to select either one of said first and second transmission lines;
    switching means for selecting transmission data from said first and second transmission lines, to be received; and
    control means for receiving a carrier-disappearance signal from said carrier-disappearance detection means and a transmission line-switching command from said transmission line switching command means and supplying said transmission line-switching command to said switching means at the time of reception of said carrier-disappearance signal.

2. The bus-redundancy type apparatus according to claim 1, wherein said carrier-disappearance detection means includes means for compensating for data propagation delay time between said first and second transmission lines and for detecting, when neither of said first and second carrier detection means detects any carrier component.

3. A bus-redundacy type apparatus for a transmitting system, comprising:
    first and second transmission lines respectively provided as a normally operating transmission line and a stand-by transmission line for data transmission in a transmission system, in which bus access control is performed;
    first and second carrier-detection means for receiving transmission data from said respective first and second transmission lines and for detecting carrier components in said transmission data;
    carrier-absence detection means for receiving the results of detection by said first and second carrier-detection means and for providing a carrier-absence signal when it is detected that either one of said first and second carrier-detection means detects the absence of a carrier;
    abnormality detection flag-generation means for receiving the carrier-absence detection signal from said carrier-absence detection means, in order to provide an abnormality detection flag; and
    control means for receiving the abnormality detection flag from said abnormality detection flag-generation means, in order to command a predetermined back-up control.

4. The bus-redundancy type apparatus according to claim 3, wherein said apparatus further comprises:
abnormality detection flag-delaying means for delaying the timing of provision of the abnormality detection flag from said abnormality detection flag-generation means, for a predetermined period of time, with respect to the timing of detection by said carrier-absence detection means.

5. The bus-redundancy type apparatus according to claim 4, wherein said predetermined period of time covers the data proportion delay time between said first and second transmission lines.

* * * * *